United States Patent
Jones et al.

(10) Patent No.: US 6,326,187 B1
(45) Date of Patent: Dec. 4, 2001

(54) METHOD TO REMEDIATE SOIL USING A SURFACTANT OF AN ALKENYLSUCCINIC ANHYDRIDE OR ACID REACTED AN AMINE ACID OR SALT OF AN AMINE ACID

(75) Inventors: Robert N. Jones; James H. Bush, both of Mentor; Stuart L. Bartley, Wickliffe; John J. Mullay, Mentor; Gregory M. Mlachak, Solon, all of OH (US)

(73) Assignee: The Lubrizol Corporation, Wickliffe, OH (US)

(*) Notice: Subject to any disclaimer, the term of this patent is extended or adjusted under 35 U.S.C. 154(b) by 0 days.

(21) Appl. No.: 09/418,347

(22) Filed: Oct. 14, 1999

(51) Int. Cl.$^7$ ........................................... C12S 9/00
(52) U.S. Cl. ..................... 435/262.5; 435/264; 134/25.1; 166/268; 166/270.1; 405/128.5
(58) Field of Search ................................ 435/262, 262.5, 435/264; 588/205, 206, 207; 134/25.1; 166/268, 246, 270.1; 210/601, 749; 405/128.15, 128.5, 128.75

(56) References Cited

U.S. PATENT DOCUMENTS

| | | | |
|---|---|---|---|
| 3,725,434 | * 4/1973 | Elliott et al. . | |
| 3,793,226 | * 2/1974 | Danzik . | |
| 3,921,718 | * 11/1975 | Tate . | |
| 4,124,512 | * 11/1978 | Stournas et al. . | |
| 4,253,974 | * 3/1981 | Valcho et al. . | |
| 4,618,450 | * 10/1986 | Higgins . | |
| 5,453,133 | 9/1995 | Sparks et al. | 134/25.1 |
| 5,611,642 | 3/1997 | Wilson | 405/128 |
| 5,634,983 | 6/1997 | Kammeraad | 134/25.1 |
| 5,725,470 | 3/1998 | Lazarowitz et al. | 588/249 |
| 5,769,569 | 6/1998 | Hosseini | 405/128 |
| 5,803,664 | 9/1998 | Kawabata et al. | 405/128 |
| 5,834,540 | 11/1998 | Katoot | 524/104 |
| 5,928,433 | * 7/1999 | Jahnke et al. . | |

* cited by examiner

Primary Examiner—William H. Beisner
(74) Attorney, Agent, or Firm—Samuel B. Laferty; Michael F. Esposito

(57) ABSTRACT

Soil, which is contaminated by one or more hydrophobic organic chemicals, can be cleaned or remediated using an aqueous composition with a surfactant prepared by reacting an alkenylsuccinic anhydride or acid with an amine acid or salt of an amine acid. The surfactant allows at least a portion of the hydrophobic organic chemical to be removed from the soil by becoming associated with the aqueous composition, which is then separated from the soil.

23 Claims, No Drawings

METHOD TO REMEDIATE SOIL USING A SURFACTANT OF AN ALKENYLSUCCINIC ANHYDRIDE OR ACID REACTED AN AMINE ACID OR SALT OF AN AMINE ACID

FIELD OF THE INVENTION

This invention relates to a method for remediation of contaminated soil by contacting said soil with a surfactant that is prepared by reacting a salt of an amine acid with an alkenylsuccinic anhydride.

BACKGROUND OF THE INVENTION

Man and the industrialized world have continually wrought havoc on the natural environment and the public is consistently reminded of the undesirable sick effects of the unfettered discharge of industrial wastes and other forms of air, water and soil pollutants. While it is still unclear exactly how much irreparable damage has been done up to this point in time, it is evident that positive steps must be taken to reverse the direction in which today's society is going and every effort must be made to save and rehabilitate that which has been already damaged.

Soil pollution is a major problem which must be addressed in the very near future. Unbridled and thoughtlessly uncontrolled dumpings of solid, liquid and gaseous pollutants find their way into the soil and can remain there for years. Polycyclic hydrocarbons, a common class of chemicals discharged by industries everywhere, possess toxic, mutagenic and carcinogenic properties. Hydrocarbon solvents have been carelessly dumped into the soil for years and problematically remain there with nowhere else to go. Thousands of tons of toxic compounds are buried in the soil every year in high commercial landfills and these are scattered throughout the surrounding area for miles by rain and sub-surface ground water. Besides industrial and municipal wastes, pesticides, herbicides, and insecticides ultimately end up in the soil and, as they are not readily degradable, persist there for a long time.

Soil pollutants widely prevalent today are known as volatile organic contaminants which are organic compounds such as low molecular weight alkanes, alcohols, amines, amides, acids, sulfites, dioxins, ethylbenzenes and PCBs. Soil decontamination of these compounds as well as other pollutants has been achieved to a limited extent through solvent extraction, coagulation, high pressure cleaning, supercritical fluid extraction, thermal desorptions, soil vapor extraction, incineration and microbial oxidation. Physical means include pumping the ground soil with water followed by air stripping the soil to remove the volatile hydrocarbons, vacuum extraction and site excavations followed by incineration of the contaminated soil.

U.S. Pat. No. 5,453,133 (Sparks et al., Sep. 26, 1995) relates to a process for removing contaminants, such as hydrocarbons, from soil. The process involves contacting the contaminated soil with a suitable solvent for the contaminant, in the presence of a bridging liquid which is immiscible with the solvent, while agitating. The amount of the bridging liquid and the degree of agitation are balanced to control the particle size of the substantially contaminant- and solvent-free soil agglomerates so formed.

U.S. Pat. No. 5,611,642 (Wilson, Mar. 18, 1997) provides a method and apparatus for in-situ treatment of soil and ground water contaminated with organic pollutants. The process involves defining the nature and extent of the contamination; determining the hydrology and geology of the contaminated area; determining the volume and concentration of a reactive solution required to effect treatment of the contaminated area; injecting the reactive solution into one or more injectors that are inserted into the ground, sealed and positioned so as to assure flow of the reactive solution through the contaminated area; allowing the reactive solution to flow through the contaminated area thereby reacting chemically with the contaminants contained within the contaminated area; and determining when the treatment is complete by monitoring by-products of the chemical reaction. Preferably, the reactive solution is an aqueous solution of hydrogen peroxide and metallic salts.

U.S. Pat. No. 5,634,983 (Kammeraad, Jun. 3, 1997) relates to a process of soil remediation in which an encapsulation solution is introduced into contact with a soil matrix containing chemical contaminants such as polynucleated aromatics chloronated hydrocarbons and the like in an amount sufficient to form a saturated admixture of the soil matrix and the encapsulation solution, the encapsulation solution being capable of preferentially attracting the chemical contaminants contained in the soil matrix, and containing an effective amount of non-ionic surfactant material, an anionic suifactant material and water; and the admixture is admixed for an interval sufficient to permit the chemical contaminants to preferentially dissociate from contact with the soil matrix in favor of association with the encapsulation solution and at least one carbon bond in the chemical contaminant to be broken as a result of interaction between the non-ionic surfactant material and the contaminant. Once this occurs, a major portion of the encapsulation solution with associated chemical contaminants can be removed from contact with the soil matrix.

U.S. Pat. No. 5,725,470 (Lazarowitz et al., Mar. 10, 1998) discloses a process for the remediation of soil containing volatile organic compounds which comprises the steps of: (1) forming an emulsifier comprising: (a) from about 70 to about 99% by weight of a sugar surfactant selected from the group consisting of an alkyl polyglycoside, a glucamide, and mixtures thereof; and (b) from about 1 to about 30% by weight of a nonionic suifactant, other than said sugar surfactant which, when combined with said sugar surfactant, provides a hydrophilic-lipophilic balance of from about 8.0 to about 13.0; (2) mixing said emulsifier with said unwanted contaminants to form a stable emulsion; and (3) removing said stable emulsion from said soil.

U.S. Pat. No. 5,769,569 (Hosseini, Jun. 23, 1998) discloses an in-situ thermal desorption system and process is utilized for mobilization and removal of non-volatile and semi-volatile hydrocarbons from contaminated soil in the vadose zone. Persistent hydrocarbons are thermally desorbed by direct heating of the contaminated zone through combustion of fuel and air in a burner underneath the contaminated soil zone. The generated soil vapors are collected and treated by soil vapor extraction techniques.

U.S. Pat. No. 5,803,664 (Kawabata et al., Sep. 8, 1998) relates to a process for remedying a soil contaminated with a pollutant by using a microorganism, comprising the steps of:

injecting a liquid containing a microorganism capable ot degrading the pollutant into a predetermined site of the soil region to be remedied; and injecting gas into the predetermined site where the liquid agent is injected, wherein the gas injection step is conducted when a water content of the site is 0.6 or more times a saturation water content of the soil.

U.S. Pat. No. 5,834,540 (Katoot, Nov. 10, 1998) relates to a composition and process for the remediation of contaminated materials, and in particular for soil remediation. The reference relates to compositions and processes that cause the breakdown of unwanted contaminates, such as hydrocarbon wastes. The reference relates to the further use of radiation, preferably microwave radiation, to effect the degradation of contaminates. The reference is equally effective in treating materials that have been exposed to harmful or infectious biological contaminates.

SUMMARY OF THE INVENTION

Disclosed is a method for remediating soil which is contaminated by one or more hydrophobic organic chemicals, comprising:

contacting the contaminated soil with an aqueous composition comprising a surfactant of the structure

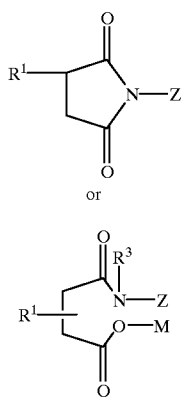

(I)

or

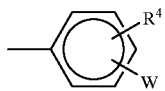

wherein, Z comprises —$R^2(O)_pSO_3M$, —$R^2COOM$ or and $R^1$ is hydrogen or a hydrocarbyl group containing from 1 to 50 carbon atoms, $R^2$ is a hydrocarbylene group containing from 1 to 22 carbon atoms, $R^3$ and $R^4$ are each independently hydrogen, a hydrocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 1 to 22 carbon atoms, p is zero or 1, W is —$SO_3M$ or —COOM and M is hydrogen, an alkali metal, an alkaline earth metal or +$NR^5R^6R^7R^8$ wherein $R^5$, $R^6$, $R^7$ and $R^8$ are independently hydrogen or hydrocarbyl groups containing from 1 to 22 carbon atoms, with the proviso that at least 9 carbon atoms are present in (I);

whereby at least a portion of said hydrophobic organic chemical becomes associated with said aqueous composition.

Thereafter the aqueous composition and organic chemicals associated therewith can be removed from the soil, or they can be decontaminated by a biological process.

DETAILED DESCRIPTION OF THE INVENTION

In the process of the present invention, the term "soil" is used in a generic sense to refer to the various materials which can be encountered in the earth and which can be the subject of contamination. Soil, therefore, includes rocks, sand, gravel, clays, silt, humus, loess, and other such components, alone or in combination, and including varying amounts of water which may be found in the presence of such components, as is found in the ground. The particular composition of soil varies from location to location in a way which is widely recognized and is well known to those skilled in the art. The particular type of soil for which the present invention is suitable is not particularly limited. For testing and evaluation purposes, a standard soil known as "Canadian River Alluvium," consisting of 72% sand, 27% silt and clay (on a dry basis), and an organic carbon content of 0.07%, is sometimes employed.

Soil can be contaminated by a variety of exogenous organic materials. The contaminants can be associated with the solid components of the soil or the water component of the soil (i.e., groundwater) or both. These contaminants are often characterized by a greater or lesser degree of hydrophobicity, water insolubility, and sometimes a tendency to sorb to various soil components. These properties make remediation of the soil more difficult. Common contaminants include crude oils, that is, mineral oils, petroleum, solvent or acid treated mineral oils, and oils derived from coal or shale. Synthetic oils can also be contaminants: these include hydrocarbon oils, halo-substituted hydrocarbon oils, alkylene oxide polymers, esters of dicarboxylic acids and polyols, esters of phosphorus-containing acids, polymeric tetrahydrofurans and silicon-based oils. Also included are crude oil fractions and refined hydrocarbons such as gasolines, kerosene, diesel fuel, and fuel oil. Also included are commercial oil-containing compositions, such as motor oils and other lubricants, transmission fluids, and hydraulic fluids.

The general terms used for soil contaminants are NAPL's—non-aqueous phase liquids and DNAPL's—dense non-aqueous phase liquids. The Environmental Protection Agency (EPA), U.S. Department of Energy (DOE), U.S. Department of Interior (DOI), and U.S. Department of Defense (DOD) have further classified these materials as follows:

1. Non-halogenated volatile organic compounds
2. Halogenated volatile organic compounds
3. Non-halogenated semi-volatile organic compounds
4. Halogenated semi-volatile organic compounds
5. Fuels Sites where non-halogenated and halogenated volatile organic compounds may be found include burn pits, chemicals manufacturing plants or disposal areas, contaminated marine sediments, disposal wells and leach fields, electroplating/metal finishing shops, firefighting training areas, hangars/aircraft maintenance areas, landfills and burial pits, leak collecting and system sanitary lines, leaking storage tanks, radioactive/mixed waste disposal areas, oxidation ponds/lagoons, paint stripping and spray booth areas, pesticide/herbicide mixing areas, solvent degreasing areas, surface impoundments, and vehicle maintenance areas.

A non-exhaustive list of typical non-halogenated volatile organic compounds (excluding fuels and gas phase contaminants) encountered at many sites include the following: n-butanol, 4-methyl-2-pentanone, acetone, acrolein, acrylonitrile, aminobenzene, carbon disulfide, cyclohexane, ethanol, ethyl acetate, ethyl ether, isobutyl alcohol, methanol, methyl ethyl ketone, methyl isobutyl ketone, styrene, tetrahydrofuran and vinyl acetate.

A non-exhaustive list of typical halogenated volatile organic compounds encountered at many sites include the following: 1,1,1,2-tetrachloroethane; 1,1,1-trichloroethane; 1,1,2,2-tetrachloroethane; 1,1,2-trichloroethane; 1,1-dichloroethane; 1,1-dichloroethylene; 1,2-dichloroethane; 1,2-dichloropropane; bromoform; bromoethane; carbon tetrachloride; chlorodibromomethane; chloroethane; chloroform; chloropropane; cis-1,2-dichloroethylene; glycerol trichlorohydrin; hexachlorobutadiene; hexachlorocyclopentadiene; hexachloroethane; methylene chloride; chloroprene; pentachloroethane; perchloroethylene; propylene dichloride; 1,2-trans-dichloroethylene; 1,3-cis-dichloro-1-propene; 1,3-trans-dichloropropene; 1-chloro-2-propene; 2-butylene dichloride; bromodichloromethane; chloroform, dibromochloropropene; dibromo-methane; dichlorobromomethane; ethylene dibromide; fluorotri-chloromethane; trichloro-trifluoroethane; monochlorobenzene; vinyl chloride; trichloroethylene and vinylidene chloride.

Sites where non-halogenated and halogenated semi-volatile organic compounds may be found are the same sites as for non-halogenated and halogenated volatile organic compounds, but also includes wood preserving sites.

A non-exhaustive list of typical non-halogenated semi-volatile organic compounds encountered at many sites include the following: 1,2-benzanthracene; 1,2-diphenylhydrazine; 1-aminonaphthalene; 2,3-phenylenepyrene; 2,4-dinitrophenol; 2-aminonaphthalene; 2-methylnaphthalene; 2-nitroaniline; 2-nitrophenol; 3-nitroaniline; 4,6-dinitro-2-methylphenol; 4-nitroaniline; 4-nitrophenol; acenaphthene; acenaphthy-lene; allyldioxybenzene methylene ether; anthracene; benzidine; benzo(a) anthracene; benzo(a)pyrene; benzo(b)fluoranthene; benzo (k)fluoroanthene; benzoic acid; benzyl alcohol; bis(2-ethylhexyl)phthalate; butylbenzylphthalate; chrysene; dibenzofuran; diethylphthalate; dimethylphthalate; di-n-butyl phthalate; di-n-octyl phthalate; diphenylenemethane; ethion; ethyl parathion; fluorene; indeno(1,2,3-cd)pyrene; isophorone; malathion; methylparathion; naphthalene; n-nitrosodimethylamine; n-nitrosodi-n-propylamine, parathion; phenanthrene; phenyl naphthalene; pyrene and tetraphene.

A non-exhaustive list of typical halogenated semi-volatile organic compounds encountered at many sites include the following: 1,2,4-trichlorobenzene; 1,2-bis(2-chloroethoxy) ethane; 1,2-dichlorobenzene; 1,3-dichlorobenzene; 1,4-dichlorobenzene; 2,4,5-trichlorophenol; 2,4,6-trichlorophenol; 2,4-dichlorophenol; 4-chloroaniline; 2-chloronaphthalene; 2-chlorophenol; 3,3-dichlorobenzidine; 4-bromophenyl ether; 4-chlorophenyl phenylether; bis(2-chloroethoxy) methane; bis(2-chloroethoxy) phthalate; bis(2-chloroethyl) ether; bis(2-chloroisopropyl) ether; chlorodane; chlorobenzilate; chlorophenothane; hexachlorobenzene; hexachlorobutadiene; p-chloro-m-cresol; pentachlorobenzene; pentachlorophenol (PCP); polychlorinated biphenyls (PCBs); quintozene; tetrachlorophenol and unsym-trichlorobenzene.

Sites where fuel may be found include the same sites as already mentioned for both non-halogenated and halogentated volatile and semi-volatile compounds. A non-exhaustive list of typical fuel contaminants encountered are as follows: the isomeric tetramethylbenzenes; the isomeric trimethylbenzenes; the isomeric methyl substituted and ethyl substituted alkanes wherein the alkanes comprise butane, pentane, hexane, heptane, octane, nonane and decane; 4-methylphenol; anthracene; benz(a)anthracene; benzene; benzo(a)pyrene; the isomeric cresols; iluoranthene; fluorene; the isomeric xylenes; naphthalene; phenanthrene; phenol; pyrene; pyridine; toluene and vinylbenzene.

The foregoing contaminants may be associated with the solid soil particles, with the water component of the soil, or in any combination thereof.

The method of this invention utilizes an aqueous composition comprising a surfactant prepared by reacting a salt of an amine acid with an alkenylsuccinic anhydride.

The Alkenyl Succinic Acid or Anhydride

The alkenyl succinic acid or anhydride is of the formula

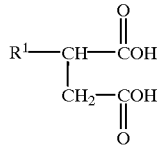

acid and

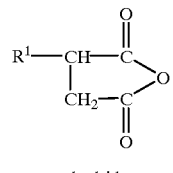

anhydride

The alkenyl succinic acid or anhydride, collectively, can be referred to as succinic acylating agents. The succinic acylating agent, when $R^1$ is a hydrocarbyl group, is prepared by reacting one mole of an olefin polymer with one mole of an unsaturated dicarboxylic acid or derivative thereof such as fumaric acid, maleic acid or maleic anhydride. Typically, the succinic acylating agents are derived from maleic acid and maleic anhydride. Preferably $R^1$ is an aliphatic group containing from 6 to 32 carbon atoms and most preferably $R^1$ contains from 8 to 18 carbon atoms.

The olefin monomers from which the olefin polymers are derived that ultimately become $R^1$ are characterized by having one or more ethylenic unsaturated groups. They can be monoolefinic monomers such as ethylene, propylene, 1-butene, isobutene and 1-octene, or polyolefinic monomers (usually diolefinic monomers such as 1,3-butadiene and isoprene). Usually these monomers are terminal olefins, that is, olefins characterized by the presence of the group $>C=CH_2$ However, certain internal olefins can also serve as monomers. When such olefin monomers are used, they normally are employed in combination with terminal olefins to produce olefin polymers which are interpolymers. Although the hydrocarbyl-based substituents may also include aromatic groups (especially phenyl groups and lower alkyl and/or lower alkoxy-substituted phenyl groups such as para (tertiary butyl) phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as 1,3-butadiene and styrene or para (tertiary butyl) styrene are exceptions to this general rule.

Generally, the olefin polymers are homo- or interpolymers of terminal hydrocarbyl olefins of about 2 to about 16 carbon atoms, a more typical class of olefin polymers is selected from the group consisting of homo- and inteipolymers of terminal olefins of two to six carbon atoms, especially those of two to four carbon atoms.

Specific examples of terminal and internal olefins which can be used to prepare the olefin polymers from which the hydrocarbon-based substituents in the acylating agents used in this invention are ethylene; propylene; 1-butene; 2-butene; isobutene; 1-pentene; 1-heptene; 1-octene; 1-nonene; 1-decene; 2-pentene; propylene tetramer; diisobutylene; isobutylene trimer; 1,2-butadiene; 1,3-butadiene; 1,2-pentadiene; 1,3-pentadiene; isoprene; 1,5-hexadiene; 2-methyl-1-heptene; 3-cyclohexyl-1-butene; 3,3-dimethyl-1-pentene; styrene divinylbenzene; vinyl acetate; allyl alcohol; 1-methylvinyl acetate; acrylonitrile; and methylvinylketone. Of these, the purely hydrocarbyl monomers are more typical and the terminal olefins are especially preferred.

Often the olefin polymers are poly(isobutene)s. These polyisobutene polymers may be obtained by polymerization of a $C_4$ refinery stream having a butene content of about 35 to about 75 percent by weight and an isobutene content of about 30 to about 60 percent by weight in the presence of a Lewis acid catalyst such as aluminum chloride or boron trifluoride. These poly(isobutene)s contain predominantly (that is, greater than 80% of the total repeat units) isobutene repeat units of the configuration.

The succinic acylating agents are well known and can be prepared by known procedures. One particularly useful procedure is to react a monoolefin monomer or oligomer as described above with maleic anhydride at 100° C. to 200° C. with or without a catalyst to form the corresponding substituted succinic acylating agent. The following examples are representative of the preparation of the succinic acylating agent.

EXAMPLE 1

Added to a flask is 1000 parts (5.95 moles) of polypropylene tetramer and 0.25 parts 2,6-di-t-butyl-4-methylphenol inhibitor. The contents are heated to 202° C. and 463 parts (4.72 moles) of maleic anhydride is added over 10 hours. The temperature is held for 8 hours at 202° C. after the completion of the maleic anhydride. The contents are then stripped to remove any unreacted polypropylene tetramer to give a branched $C_{12}$ succinic anhydride.

The Amine Acid or Salt of an Amine Acid

The amine acid or salt of the amine acid can be represented by the formula

wherein, Z comprises —$R^2(O)_pSO_3M$, —$R^2COOM$ or

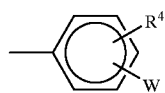

and $R^2$ is a hydrocarbylene group containing from 1 to 22 carbon atoms, $R^3$ and $R^4$ are each independently hydrogen, a hydiocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 1 to 22 carbon atoms, p is zero or 1, W is —$SO_3M$ or —COOM and M is hydrogen, an alkali metal, an alkaline earth metal or $+NR^5R^6R^7R^8$ wherein $R^5$, $R^6$, $R^7$ and $R^8$ are independently hydrogen or hydrocarbyl groups containing from 1 to 22 carbon atoms.

When Z is —$R^2(O)_pSO_3M$, preferably p is zero and $R^2$ contains from 1 to 4 carbon atoms and most preferably $R^2$ is methylene or ethylene. When Z is —$R^2COOM$, preferably $R^2$ contains from 6 to 20 carbon atoms and most preferably contains from 8 to 18 carbon atoms. When Z is

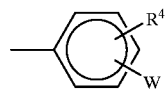

preferably $R^4$ is hydrogen. For formula (I), M is preferably a metal comprising the alkali metals of lithium, sodium or potassium, or the alkaline earth metals of magnesium, calcium or barium. The most preferred metal is sodium.

The salt of the amine acid is prepared by reacting an amine acid with a metal oxide, metal hydroxide or amine. Three types of amine acids are envisioned: amine sulfonic acids, amine hydrogen sulfates and amine carboxylic acids. The amine sulfonic acids and amine hydrogen sulfates can be represented by the formulae

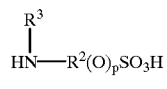

and

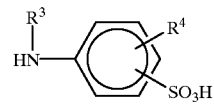

wherein the values of $R^2$, $R^3$, $R^4$ and p are as defined above. When p is zero, an amine sulfonic acid is generated and when p is 1, an amine hydrogen sulfate is generated.

When p is zero, preferably $R^2$ contains from 1 to 4 carbon atoms and most preferably $R^2$ is methylene or ethylene. Preferably, $R^3$ is hydrogen. Representative examples of the amine sulfonic acid are aminomethanesulfonic, 2-aminoethanesulfonic acid, 3-amino-1-propanesulfonic acid, 2-amino-2-methylpropane sulfonic acid and 4-amino-1-butanesulfonic acid.

When p is 1, preferably $R^2$ contains 1 or 2 carbon atoms and most preferably $R^2$ is ethylene. An example of the amine hydrogen sulfate is 2-aminoethyl hydrogensulfate.

Of p=zero or p=1, preferably p is zero.

When the amine sulfonic acid is

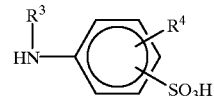

preferably both $R^3$ and $R^4$ are hydrogen. Several examples of this amine sulfonic acid are aniline-2-sulfonic acid, metanilic acid, and sulfanilic acid.

The amine carboxylic acids are represented by the formulae

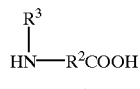

and

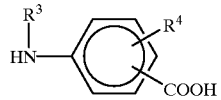

wherein the values of $R^2$, $R^3$ and $R^4$ are as defined above. Preferably $R^3$ and $R^4$ are hydrogen and preferably $R^2$ contains from 1 to 4 carbon atoms. Most preferably $R^2$ contains up to 3 carbon atoms. Examples of the amine carboxylic acid are glycine, the isomeric aminopropanoic acids, the isomeric aminobutyric acids, the isomeric aminovaleric acids, aminooctanoic acid, aminononanonic acid, aminodecanoic acid, aminoundecanoic acid, aminododecanoic, aminomyristic acid, aminopalmitic acid, aminostearic acid, aminooleic acid and the isomeric aminobenzoic acids.

The above-described surfactants are used in water or other solvents, generally at a concentration of 0.005 to 5 weight percent, preferably 0.25 to 3 percent and more preferably 2 to 3 percent (based on active chemical, exclusive of diluent water or solvents). The amounts can be adjusted, as needed, to optimize performance for a particular combination of soil and contaminant. For in situ remediation, concentrations of 1 to 3 weight percent are sometimes preferred; for ex situ remediation (where soil is removed from the ground and treated), concentrations of 0.01 to 0.5 weight percent are sometimes preferred. The surfactant can be dissolved or otherwise dispersed in the water; preferably the sulfactant is dissolved.

If desired, one or more additional surfactants, preferably in amounts within the ranges set forth above, can be used along with the above-described materials. Common surfactants can be characterized as non-ionic, anionic, cationic, or amphoteric. Non-ionic surfactants include nonylphenol (POE5), octylphenol (POE5), lauryl alcohol (POE5), octadecyl alcohol (POE5), sorbitan monooleate, sorbitan monooleate (POE5), glycerol monooleate, lauryl alcohol polyglycoside, oleicdiethanolamide, oleylhydroxymethyl imidazoline, oleylamine (POE5), oleyl dimethylamine oxide, poly(ethylene oxide [m.w. 400]) dioleate, and poly (ethylene oxide) 14 oleate.

Anionic surfactants include sodium laurate, sodium xylene sulfonate, sodium dodecylbenzene sulfonate, sodium monomethylnaphthalene sulfonate, sodium dimethylnaphthalene sulfonate, dioctyl sodium sulfosuccinate, sodium hexadecyl sulfonate, dodecyldiphenyloxide disulfonate (disodium salt), hexadecyldiphenyloxide disulfonate (disodium salt), sodium decyl sulfate, sodium lauryl (POE2) sulfate, nonylphenol (POE2) sulfate (sodium salt), sodium N-methyl-N-oleoyl taurate, sodium di-2-ethylhexyl phosphate, sodium cocyl isethionate, and sodium lauryl (POE13) acetate.

Cationic surfactants include benzyl trimethylammonium bromide and cetyl pyridinium chloride. Amphoteric surfactants include lecithin and lauryldimethylhydroxypropylsulfobetaine.

In the foregoing materials, the expression "POEn" indicates an ethylene oxide oligomer containing n repeat units, attached by an ether linkage through an alcoholic or phenolic oxygen atom of the remainder of the molecule.

The surfactant-water combination is used to contact the contaminated soil and to remove organic contaminants therefrom by mechanical techniques which are known to those skilled in the art. Using a process based on the conventional "pump and treat" procedure, the aqueous composition can be injected into the ground at or near a site of contamination, and a water composition, comprising the surfactant and a portion of the contaminants, can be pumped out from the ground in such a way that the water/surfactant composition has traversed at least a portion of the contaminated soil. The aqueous composition thereby recovered can be treated for waste processing and management. Such treatment can consist of separation of the contaminant from the water and surfactant by known means such as air stripping, foam fractionation, distillation, coagulation, solidification, filtration, or other such techniques, and subsequent disposal of the contaminant, for example, by combustion. It is also possible to recover some or all of the sulfactant for reuse, if desired.

Alternatively, a portion of contaminated soil can be removed from the ground and treated with a suitable aqueous solution of surfactant in an appropriate apparatus. The soil can be contacted with the surfactant solution by stirring or slurrying in a batch-type operation, or by passing the solution through the soil in a continuous fashion. The aqueous solution, containing a portion of the organic contaminant, can be separated from the soil by known methods such as filtration, decantation, or centrifugation. Remediation by removal of the soil and treatment in this manner is particularly suitable for small and localized areas of contamination or for spot testing and evaluation purposes.

In yet another approach, the surfactants of the present invention can be used in surfactant-assisted bioremediation processes, that is, a process in which the decontamination is effected by a surfactant-assisted biological process. In such processes, it is speculated that the surfactant may serve to "loosen" the contaminant from the soil particles and make it more readily available for decontamination. The contamination itself is effected, optionally in situ, by biological processes resulting from, for instance, the action of bacteria or other organisms, whether organisms naturally occurring (naturally present in the soil) or selected or designed for the purpose of decontamination. In this embodiment, physical removal of the aqueous compositions and organic chemicals associated therewith from the soil may not be necessary.

It is known that some of the materials described above may interact in the final formulation, so that the components of the final formulation may be different from those that are initially added. For instance, metal ions (of e.g., a detergent) can migrate to other acidic sites of other molecules. The products formed thereby, including the products formed upon employing the sulifactant of this invention in its intended use, may not be susceptible of easy description. Nevertheless, all such modifications and reaction products are included within the scope of the present invention.

The salt of the amine acid is prepared prior to reacting with the succinic acylating agent. The salt of the amine acid need not be isolated prior to reacting with the succinic acylating agent.

The following examples are illustrative of the preparation of the sulfactants of this invention. Unless otherwise indicated, all parts and percentages are by weight.

EXAMPLE 2

Added to a flask is 266 parts (1 mole) of the branched dodecenyl succinic anhydride as prepared in Example 1 and stirring is begun at room temperature. Added to a beaker is 125 parts (1 mole) 2-aminoethanesulfonic acid, 517 parts distilled water and 40 parts (1 mole) sodium hydroxide dissolved in 40 parts water. The beaker contents are stirred such that the contents react together to form an aqueous solution of a sodium salt of 2-aminoethanesulfonic acid. The beaker contents are then added to the flask and the temperature is increased to 97° C. over 2.5 hours. The contents are further heated to 102° C. and held at this temperature for 24 hours. The contents are then poured into an evaporating dish, placed in a 130° C. oven for 3 hours. A solid beige product is obtained having a % nitrogen of 3.46.

EXAMPLE 3

Added to a flask is 200 parts (0.75 moles) of dodecenyl succinic anhydride as prepared in Example 1 and 600 ml of xylenes and stirring is begun at room temperature. Prepared in a beaker is 110.6 parts (0.75 moles) of an aqueous solution of the sodium salt of 2-aminoethanesulfonic acid. The beaker contents are added to the flask. The contents are stirred at 100° C. while removing water by azeotrope. The contents are then heated to 135° C. and held for 1.5 hours. The contents are then poured into a resin flask and xylenes are removed at 100° C. and 30 mm mercury. A solid beige product is obtained having a % sulfur of 7.79.

EXAMPLE 4

Added to a flask are 322 parts (1 mole) of hexadecenyl succinic anhydride and 800 parts xylenes and the contents are stirred. In a beaker is reacted 125 parts (1 mole) 2-aminoethanesulfonic acid, 170 parts water and 40 parts (1 mole) sodium hydroxide dissolved in 40 parts water to form an aqueous solution of the sodium salt of 2-aminoethanesulfonic acid salt. The beaker contents are then added to the flask and the contents are stirred and heated to 95° C. and held at that temperature for 5 hours. The temperature is increased to 135° C. while removing water by azeotropic distillation. The contents are then transferred to a rotary evaporator and xylenes are removed at 100° C. and 30 mm of mercury. A beige solid is obtained having a % nitrogen of 2.99.

EXAMPLE 5

Added to a flask are 133 parts (0.5 moles) of 2-aminopropionic acid and 100 parts water. Stirring is begun and a solution of 20 parts (0.5 moles) of sodium hydroxide dissolved in 20 parts water is added to the flask. The addition is exothermic to 33° C. Mixed in a beaker is 133 parts (0.5 moles) of dodecenyl succinic as prepared in Example 1 and 500 parts xylenes. The beaker contents are added to the flask. The contents are heated to 135° C. over a 5 hour period and held at 135° C. for 2 hours, all the while removing water by azeotropic distillation. The contents are then transferred to a rotary evaporator and xylenes are removed at 100° C. and 25 mm mercury. A beige solid is obtained having a % nitrogen of 3.7.

EXAMPLE 6

Added to a Hobart mixing bowl are 59.6 parts (0.282 moles) of n-octenyl succinic anhydride, 55.1 parts (0.282 moles) of a sodium salt of sulfanilic acid and 80 parts water. The contents are mixed with gentle stirring over 30 minutes to 70° C. and later increased to 85° C. and held for 30 minutes. A beige waxy solid is obtained having a % nitrogen of 3.00 and % sulfur of 8.22.

EXAMPLE 7

Added to a flask is 300 ml of xylenes and 181.4 parts (0.682 moles) of a straight chain $C_{12}$ succinic anhydride available from Humphrey Chemical, a Cambrex company, of North Haven, Conn. Stirring is begun and a beaker solution of 104.8 parts (0.682 moles) of sodium taurine dissolved in 160 ml of water is added to the flask. The addition causes an exotherm to 42° C. resulting in a thick solid waxy white mass. An additional 300 ml of xylenes is added. The water is azeotroped out at 135° C. over a three-hour period. The contents are cooled and transferred to a resin flask and xylenes are removed by vacuum distillation up to 100° C. The beige solid product obtained has a % sulfur of 8.01.

The surfactants of this invention are evaluated in the laboratory in an emulsion formation test. In this test, 2 ml of a suifactant solution is mixed with 2 ml of a contaminant. The contaminant is 1,1,1-trichloroethane. The surfactant solution is prepared by combining together a specific number of microliters of a 16% weight aqueous solution of the product of the above Example 3, a 50% weight aqueous solution of isopropyl alcohol, a 2% weight aqueous solution of calcium chloride, and a 2% weight aqueous solution of sodium chloride. Additional water in microliters is added to give a 2 ml. surfactant solution.

But for the microliter quantities, the above surfactant solution is identical to that which would be used at a contamination site.

The above surfactant solution and contaminant are mixed together and permitted to separate. The separation falls in one of three Winsor classes, designated Winsor I, Winsor II, or Winsor III. Winsor I means the sample mixture separated into two phases with the phases identified as an emulsion phase/aqueous phase or as an organic phase/emulsion phase. In the field, the emulsion phase contains the entrapped contaminant. It is the entrapped contaminant that is removed in situ or separated out ex situ. The aqueous phase, when present in Winsor I is also pumped out. This aqueous phase which is primarily the surfactant solution can be pumped back in to emulsify with the remaining contaminant. This repumping or reusing of the surfactant is similar to an extraction in a separatory funnel.

Like Winsor I, Winsor II also means a separation into two phases. However, there is no organic phase. There is only an emulsion phase and an aqueous phase. In the emulsion phase of a Winsor I, the organic contaminant is pulled into the aqueous phase. But in a Winsor II, the aqueous phase is pulled into the organic contaminant phase which is an invert emulsion. Invert emulsions are to be avoided in soil remediation. A surfactant that gives a Winsor II causes the ground water to be pulled into the contaminant thus making the contamination situation much worse.

In the Winsor III, there are three phases, an organic phase, an emulsion phase (actually a microemulsion) and an aqueous phase. In a Winsor III, it is desirable to have a high microemulsion phase and low, but equal, organic and aqueous phases. This signifies that a high percentage of contaminant can be removed in just one pass of surfactant solution into the soil. However, even with a low percentage of microemulsion phase, a surfactant solution may still have utility simply by being reused and subsequently repumped back into the soil.

The following Table I gives results of a surfactant solution prepared from the procedure of Example 3 with isopropyl alcohol, calcium chloride, sodium chloride and water being mixed with a contaminant of 1,1,1-trichloroethane. For the results in all the tables, the sum of the organic, emulsion and aqueous is 4 ml. However, in some instances, a sample will have a Winsor I even thought the emulsion is reported out as a zero. This only means that the emulsion phase was too small to measure. In other instances, a Winsor value cannot be assigned because no emulsion phase is formed. This means that the surfactant solution and contaminant form two distinct phases and are designated as TP in the tables.

TABLE I

| Test No | Surfactant solution | Isopropyl alcohol solution | CaCl$_2$ solution | NaCl solution | Water | Results (ml) Organic | Emulsion | Aqueous | Winsor |
|---|---|---|---|---|---|---|---|---|---|
| 1 | 750 | 0 | 150 | 500 | 600 | 2.2 | 1.0 | 1.0 | III |
| 2 | 500 | 160 | 400 | 100 | 840 | 1.6 | 2.4 | 0.0 | I |
| 3 | 250 | 160 | 225 | 100 | 1265 | 1.9 | 1.0 | 1.1 | III |
| 4 | 500 | 80 | 50 | 250 | 1120 | 2.3 | 1.5 | 0.2 | III |
| 5 | 750 | 160 | 400 | 250 | 440 | 1.2 | 1.6 | 1.2 | III |
| 6 | 500 | 80 | 225 | 100 | 1095 | 2.1 | 1.8 | 0.1 | III |
| 7 | 500 | 80 | 225 | 400 | 795 | 2.0 | 1.8 | 0.1 | III |

Table II gives results of surfactant solution prepared by utilizing a surfactant as prepared in Example 9 with isopropyl alcohol, calcium chloride, sodium chloride water that is mixed with a contaminant of 1,1,1-trichloroethane

TABLE II

| Test No | Surfactant solution | Isopropyl alcohol solution | CaCl$_2$ solution | NaCl solution | Water | Results (ml) Organic | Emulsion | Aqueous | Winsor |
|---|---|---|---|---|---|---|---|---|---|
| 1 | 750.0 | 120.0 | 0.0 | 500.0 | 630 | 0.6 | 1.7 | 1.7 | III |
| 2 | 500.0 | 0.0 | 150.0 | 200.0 | 1150 | 0.2 | 1.8 | 2.0 | III |
| 3 | 500.0 | 240.0 | 150.0 | 200.0 | 910 | 0.3 | 1.7 | 2.0 | III |
| 4 | 250.0 | 120.0 | 150.0 | 200.0 | 1280 | 0.1 | 3.7 | 0.1 | III |
| 5 | 750.0 | 120.0 | 150.0 | 800.0 | 180 | 0.2 | 3.7 | 0.1 | III |
| 6 | 500.0 | 240.0 | 300.0 | 500.0 | 460 | 0.2 | 3.6 | 0.2 | III |

Tables III and IV give results of surfactant solutions prepared by utilizing commercial surfactants that have been disclosed in several publications and that are widely used in surfactant enhanced soil remediation. In Table III the commercial surfactant is Dowfax™ 8390 available from Dow Chemical, Midland, Mich. In Table IV the commercial surfactant is Aerosol™ M-80 available from Cytec Industries, Inc. West Patterson, N.J. As in Tables I and II, the surfactant solutions of Tables III and IV are prepared by combining together a specific number of microliters of a 16% weight aqueous solution of the commercial surfactant, a 50% weight aqueous solution of isopropyl alcohol, a 2% weight aqueous solution of calcium chloride, and a 2% weight aqueous solution of sodium chloride. Additional water in microliters is added to give a 2 ml surfactant solution. These surfactant solutions utilizing these commercial surfactants are then combined with 2 ml of contaminant of 1,1,1-trichloroethane.

TABLE III

| Test No | Surfactant solution | Isopropyl alcohol solution | CaCl$_2$ solution | NaCl solution | Additional Water | Results (ml) Organic | Emulsion | Aqueous | Winsor |
|---|---|---|---|---|---|---|---|---|---|
| 1 | 1500 | 0 | 0 | 0 | 500 | 1.9 | 0.1 | 2.0 | III |
| 2 | 750 | 0 | 0 | 0 | 1250 | 1.9 | 0.1 | 2.0 | III |
| 3 | 750 | 0 | 0 | 350 | 900 | 2.0 | 0 | 2.0 | TP |
| 4 | 750 | 120 | 0 | 600 | 530 | 2.0 | 0 | 2.0 | TP |
| 5 | 750 | 240 | 0 | 350 | 660 | 2.0 | 0 | 2.0 | TP |
| 6 | 750 | 240 | 300 | 350 | 360 | 2.0 | 0 | 2.0 | TP |
| 7 | 750 | 120 | 300 | 350 | 480 | 2.0 | 0 | 2.0 | TP |
| 8 | 750 | 120[1] | 0 | 350 | 780 | 2.0 | 0 | 2.0 | TP |

[1]sec-butyl alcohol is substituted for isopropyl alcohol. TP = two distinct phases

TABLE IV

| | | Microliters | | | | Results (ml) | | | |
|---|---|---|---|---|---|---|---|---|---|
| Test No | Surfactant solution | Isopropyl alcohol solution | CaCl$_2$ solution | NaCl solution | Additional Water | Organic | Emulsion | Aqueous | Winsor |
| 1 | 1500 | 0 | 0 | 0 | 500 | 2.0 | 0 | 2.0 | TP |
| 2 | 750 | 0 | 0 | 0 | 1250 | 1.9 | 0 | 2.1 | I |
| 3 | 750 | 0 | 0 | 350 | 900 | 0 | 2.1 | 1.9 | II |
| 4 | 750 | 120 | 0 | 600 | 530 | 2.0 | 0 | 2.0 | TP |
| 5 | 750 | 240 | 0 | 350 | 660 | 2.1 | 0 | 1.9 | I |
| 6 | 750 | 240 | 300 | 350 | 360 | 2.1 | 0 | 1.9 | I |
| 7 | 750 | 120 | 300 | 350 | 480 | 2.1 | 0 | 1.9 | I |
| 8 | 750 | 120[1] | 0 | 350 | 780 | 2.2 | 0 | 1.8 | I |

[1]sec-butyl alcohol is substituted for isopropyl alcohol. TP = two distinct phases From the above four tables it can be observed that the surfactants of the instant invention, when made into surfactant solutions as shown in Tables I and II, are much more effective in emulsifying a contaminant than are commercial surfactants as shown in Tables III and IV when made into surfactant solutions.

While the invention has been explained in relation to its preferred embodiments, it is to be understood that various modifications thereof will become apparent to those skilled in the art upon reading the disclosure. Therefore, it is to be understood that the invention disclosed herein is intended to cover such modifications as fall within the scope of the appended claims.

What is claimed is:

1. A method for remediating soil which is contaminated by one or more hydrophobic organic chemicals, comprising:
   contacting the contaminated soil with an aqueous composition comprising a surfactant of the structure

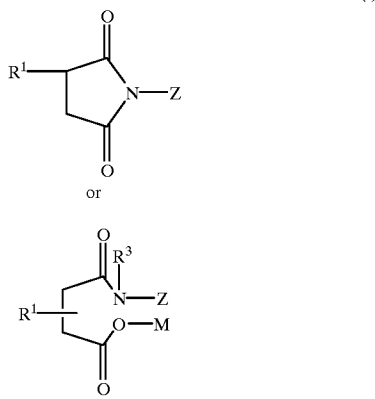

(I)

wherein, Z comprises —R$^2$(O)$_p$SO$_3$M or —R$^2$COOM and wherein R$^1$ is hydrogen or a hydrocarbyl group containing from 1 to 50 carbon atoms, R$^2$ is a hydrocarbylene group containing from 1 to 4 carbon atoms, R$^3$ is independently hydrogen, a hydrocarbyl group, a hydroxyhydrocarbyl group, an alkoxyhydrocarbyl group wherein up to 12 carbon atoms are in the alkoxy group or an aminohydrocarbyl group, wherein the hydrocarbyl group contains from 1 to 22 carbon atoms, p is zero or 1, and M is hydrogen, an alkali metal, an alkaline earth metal or —NR$^5$R$^6$R$^7$R$^8$ wherein R$^5$, R$^6$, R$^7$ and R$^8$ are independently hydrogen or hydrocarbyl groups containing from 1 to 22 carbon atoms, with the proviso that at least 9 carbon atoms are present in (I);

whereby at least a portion of said hydrophobic organic chemical becomes associated with said aqueous composition.

2. The method of claim 1 wherein the hydrophobic organic chemical comprises crude oil or a crude oil fraction.
3. The method of claim 1 wherein the hydrophobic organic chemical comprises a refined hydrocarbon.
4. The method of claim 1 wherein the hydrophobic organic chemical comprises a chlorinated hydrocarbon.
5. The method of claim 1 wherein R$^1$ is an aliphatic group containing from 6 to 32 carbon atoms.
6. The method of claim 1 wherein R$^1$ is an alkyl group containing from 8 to 18 carbon atoms.
7. The method of claim 1 wherein when Z is —R$^2$(O)$_p$SO$_3$M and p is zero.
8. The method of claim 7 wherein R$^2$ is methylene.
9. The method of claim 7 wherein R$^2$ is ethylene.
10. The method of claim 1 wherein when Z is —R$^2$COOM.
11. The method of claim 10 wherein R$^2$ contains up to 3 carbon atoms.
12. The method of claim 1 wherein M is an alkali metal.
13. The method of claim 1 wherein R$^3$ is hydrogen.
14. The method of claim 1 wherein M is sodium.
15. The method of claim 1 further comprising removing said aqueous compositions and organic chemicals associated therewith from the soil.
16. The method of claim 15 wherein the aqueous composition is injected into an area of contaminated soil and removed at a different location, whereby the aqueous composition passes through the contaminated soil and at least a portion of said hydrophobic organic chemical becomes associated with said aqueous composition and are hereby removed from the soil.
17. The method of claim 15 wherein R$^1$ is a dodecyl group.
18. The method of claim 1 wherein contaminated soil is removed from the ground and treated with an aqueous solution of the surfactant.
19. The method of claim 1 further comprising subjecting the soil thus treated to the action of a biological process, whereby decontamination is effected.
20. The method of claim 19 wherein decontamination is effected in situ.
21. The method of claim 19 wherein the biological process is effected by naturally present bacteria.

22. The method of claim 19 wherein the biological process is effected by bacteria selected for the purposes of decontamination.

23. A method for remediating soil which is contaminated by one or more hydrophobic organic chemicals, comprising:

contacting the contaminating soil with an aqueous composition prepared by reacting one equivalent of

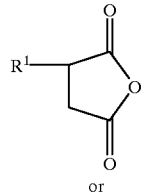

or

-continued

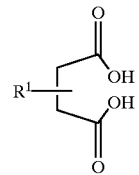

wherein $R^1$ is an alkyl group containing from 8 to 18 carbon atoms, with one equivalent each of 2-aminoethanesulfonic acid and sodium hydroxide forming an imide linkage and removing said aqueous compositions and organic chemicals associated therewith from the soil.

* * * * *